(12) United States Patent
Maruyama et al.

(10) Patent No.: US 8,501,842 B2
(45) Date of Patent: Aug. 6, 2013

(54) POLYPROPYLENE RESIN COMPOSITION AND MOLDED ARTICLE

(75) Inventors: Takeshi Maruyama, Valley Park (SG);
Tsuyoshi Watanabe, Ichihara (JP);
Yoshiaki Oobayashi, Yokohama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 368 days.

(21) Appl. No.: 12/808,534

(22) PCT Filed: Dec. 19, 2008

(86) PCT No.: PCT/JP2008/073893
§ 371 (c)(1),
(2), (4) Date: Jun. 16, 2010

(87) PCT Pub. No.: WO2009/082019
PCT Pub. Date: Jul. 2, 2009

(65) Prior Publication Data
US 2010/0292371 A1   Nov. 18, 2010

(30) Foreign Application Priority Data
Dec. 21, 2007   (JP) ................................. 2007-329885

(51) Int. Cl.
*C08K 5/34*   (2006.01)

(52) U.S. Cl.
USPC .............................. 524/99; 524/86

(58) Field of Classification Search
USPC ................... 524/86, 102, 108, 111, 445, 529, 524/530, 538, 99
See application file for complete search history.

(56) References Cited

U.S. PATENT DOCUMENTS

| | | | |
|---|---|---|---|
| 4,866,136 A | 9/1989 | MacLeay | |
| 5,723,527 A | 3/1998 | Sadatoshi et al. | |
| 2003/0069337 A1* | 4/2003 | Gugumus | 524/100 |
| 2003/0153653 A1 | 8/2003 | Gugumus | |

FOREIGN PATENT DOCUMENTS

| | | | |
|---|---|---|---|
| GB | 2 105 731 A | | 3/1983 |
| GB | 2 145 100 A | | 3/1985 |
| JP | 58-38708 A | | 3/1983 |
| JP | 64-51407 A | | 2/1989 |
| JP | 5-51498 A | | 3/1993 |
| JP | 8-302108 A | | 11/1996 |
| JP | 10-87919 A | | 4/1998 |
| JP | 10-292072 A | | 11/1998 |
| JP | 2001-098168 A | | 4/2001 |
| JP | 2001-509521 A | | 7/2001 |
| JP | 2002-12720 A | | 1/2002 |
| JP | 2002-121331 A | | 4/2002 |
| JP | 2003-105163 A | | 4/2003 |
| JP | 2003-524047 A | | 8/2003 |
| JP | 2004-323545 A | | 11/2004 |
| JP | 2004-323546 A | | 11/2004 |
| JP | 2007-92049 A | | 4/2007 |
| JP | 2007-326978 | * | 12/2007 |
| WO | 99/02495 | | 1/1999 |

OTHER PUBLICATIONS

ISR issued for PCT/JP2008/073893 (International application of the present application), with English translation of Written Opinion of the International Searching Authority issued for PCT/JP2008/073893.

* cited by examiner

*Primary Examiner* — Hui Chin
(74) *Attorney, Agent, or Firm* — Sughrue Mion, PLLC

(57) ABSTRACT

Provided are a polypropylene resin composition which produces only a little mold staining at the time of molding, which is excellent in the stability against light and the molding processability, which has good balance between high rigidity and impact resistance, and which can give a molded article excellent in flow mark appearance and weld appearance when being processed into a molded article, and a molded article produced therefrom. The polypropylene resin composition of the present invention contains 99 to 60 parts by weight of propylene-based polymer (A), 1 to 40 parts by weight of inorganic filler (B) having an average particle diameter of 0.01 to 100 μm, and 0.05 to 5 parts by weight, per 100 parts by weight of the resin composition (I), of an hindered amine-type light stabilizer (C) which satisfies the specified requirements (a), (b) and (c), provided that the combined amount of the propylene-based polymer (A) and the inorganic filler (B) is 100 parts by weight.

5 Claims, No Drawings

POLYPROPYLENE RESIN COMPOSITION AND MOLDED ARTICLE

TECHNICAL FIELD

The present invention relates to polypropylene resin compositions and molded articles made therefrom.

BACKGROUND ART

Polypropylene resin compositions are materials excellent in rigidity, impact resistance, etc, and they, therefore, are used in a wide variety of applications in the form of molded articles such as automotive interior or exterior components and housings of electric appliances. It is known that polypropylene resins are used with incorporation of a heat resistance stabilizer, a weathering stabilizer or an antistatic agent according to the performance demanded in the intended application.

On the other hand, a polypropylene resin composition containing such additives may result in occurrence of defective appearance with a product due to accumulation of volatile components on the surface of a mold during its molding process such as injection molding carried out continuously by the use of the mold. In order to cope with such staining of a mold, improvement by addition of a specific additive has been made.

For example, Japanese Unexamined Patent Application Publication No. 2002-12720 discloses a polypropylene resin composition containing 0.0 to 0.5% by weight of three kinds of hindered amine light stabilizers each having a specified structure and a specified molecular weight and 0.01 to 0.5 parts by weight of a triarylphosphite type heat resistance stabilizer.

Japanese Unexamined Patent Application Publication No. 10-292072 discloses a polypropylene resin composition comprising 0.01 to 0.2 parts by weight of a hindered phenol antioxidant, 0.01 to 0.3 parts by weight of a weathering agent, 0.01 to 0.2 parts by weight of a fatty acid amide and/or a fatty acid bisamide, and 0.01 to 2.0 parts by weight of an antistatic agent.

Polypropylene resin compositions, however, have been required to have improved stability against light and improved anti-mold staining property and to further reduce the emitted amount of volatile organic compounds (VOC) emitted therefrom.

DISCLOSURE OF THE INVENTION

The objective of the present invention is to provide a polypropylene resin composition which can reduce the emitted amount of volatile organic compounds (VOC) and mold staining at the time of molding and provide molded articles excellent in stability against light and thermal stability and to provide a molded article produced therefrom.

The present invention provides a polypropylene resin composition comprising 99 to 60 parts by weight of propylene-based polymer (A), 1 to 40 parts by weight of inorganic filler (B) having an average particle diameter of 0.01 to 100 μm, and 0.05 to 5 parts by weight of an hindered amine-type light stabilizer (c) which satisfies requirements (a), (b) and (c) defined below, provided that the combined amount of the propylene-based polymer (A) and the inorganic filler (B) is 100 parts by weight:

requirement (a): it has a 2,2,6,6-tetramethylpiperidyl group represented by formula (I);

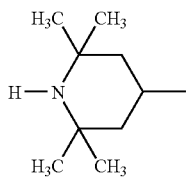

requirement (b): it has an acid dissociation constant (pka) of less than 8;

requirement (c): the weight loss, as measured in an thermogravimetric analysis at a measurement temperature of 300° C. under a nitrogen gas atmosphere, is less than 10% by weight.

MODE FOR CARRYING OUT THE INVENTION

Polypropylene Resin Composition

The polypropylene resin composition of the present invention comprises a propylene-based polymer (A), an inorganic filler (B) having an average particle diameter within a specified range, and a specified hindered amine light stabilizer (C).
[Polypropylene Resin Composition (I)]
<Propylene-Based Polymer (A)>

The propylene-based polymer (A) to be used for the present invention is at least one polymer selected from the group consisting of a propylene homopolymer (A-1) and a propylene-based block copolymer (A-2). The propylene-based block copolymer (A-2) is any propylene-based block copolymer that is composed of a polymer component (A-2-I) which is a propylene homopolymer component or a copolymer component composed mainly of units derived from propylene, and a copolymer component (A-2-II) which is a copolymer component made from propylene and at least one comonomer selected from the group consisting of ethylene and α-olefins having 4 to 12 carbon atoms.

From the viewpoint of the fluidity of a resin composition at the time of injection molding and the impact resistance of a molded article, the propylene homopolymer (A-1) preferably has a melt flow rate (henceforth, MFR), measured at a temperature of 230° C. and a load of 2.16 kgf in accordance with JIS K6758, of 2 to 150 g/10 min, and preferably 15 to 130 g/10 min.

From the viewpoint of the rigidity and the heat resistance of a molded article and the crystallization time in a cooling process in molding, the isotactic pentad fraction (henceforth, also referred to as mmmm fraction) measured by $^{13}$C-NMR of the propylene homopolymer (A-1) preferably is 0.95 or more, and more preferably is 0.97 or more.

The isotactic pentad fraction is a fraction of units derived from propylene monomers which are each present at the center of an isotactic chain in the form of a pentad unit, namely a chain in which five propylene monomer units are meso-bonded successively, in the polypropylene molecular chain, as measured by the method reported in A. Zambelli et al., Macromolecules, 6, 925 (1973), namely, by a method using $^{13}$C-NMR. NMR absorption peaks are assigned according to the disclosure of Macromolecules, 8, 687 (1975). Specifically, the isotactic pentad fraction is determined as an area fraction of mmmm peaks in the whole peak area of methyl carbon ranges of a $^{13}$C-NMR spectrum. According to this method, the isotactic pentad fraction of an NPL standard substance, CRM No. M19-14 Polypropylene PP/MWD/2 available from NATIONAL PHYSICAL LABORATORY, G.B. was measured to be 0.944.

The molecular weight distribution measured by gel permeation chromatography (GPC), which is sometimes referred to as Q value or Mw/Mn in the art, of the propylene homopolymer (A-1) preferably is 3 or more and 7 or less, and more preferably is 3 to 5.

The α-olefin other than propylene which constitutes the propylene-based block copolymer (A-2) preferably is an α-olefin having 4 to 12 carbon atoms, examples of which include 1-butene, 1-pentene, 1-hexene, 4-methyl-1-heptene, 1-octene and 1-decene. More preferably, it is 1-butene, 1-hexene or 1-octene.

The polymer component (A-2-I) is a propylene homopolymer component or a propylene-based copolymer component composed mainly of units derived from propylene. The copolymer component composed mainly of units derived from propylene is a copolymer component which is composed of propylene-derived units in an amount of not less than 70% by weight but less than 100% by weight of the amount of all monomers, and units derived from at least one comonomer selected from the group consisting of ethylene and α-olefins having 4 to 12 carbon atoms.

In the polymer-based copolymer component composed mainly of propylene-derived units as polymer component (A-2-I), the content of the units derived from the at least one comonomer selected from the group consisting of ethylene and α-olefins having 4 to 12 carbon atoms is 0.01 to 30% by weight, where the amount of the polymer component (A-2-I) is let be 100% by weight.

Examples of the α-olefins having 4 to 12 carbon atoms include 1-butene, 1-pentene, 1-hexene, 4-methyl-1-heptene, 1-octene and 1-decene. 1-Butene, 1-hexene and 1-octene are preferred.

Examples of the polymer-based copolymer component composed mainly of propylene-derived units as polymer component (A-2-I) include a propylene-ethylene copolymer component, a propylene-1-butene copolymer component, a propylene-1-hexene copolymer component, a propylene-ethylene-1-butene copolymer component, a propylene-ethylene-1-hexene copolymer component, a propylene-ethylene-1-octene copolymer component, and a propylene-1-octene copolymer component.

The copolymer component (A-2-II) is a copolymer composed of units derived from at least one comonomer selected from the group consisting of ethylene and α-olefins having 4 to 12 carbon atoms and units derived from propylene.

The content of the units derived from at least one comonomer selected from the group consisting of ethylene and α-olefins having 4 to 12 carbon atoms in the copolymer component (A-2-II) is 1 to 80% by weight, preferably is 20 to 70% by weight, and more preferably is 30 to 60% by weight, where the amount of the copolymer component (A-2-II) is let be 100% by weight.

Examples of the α-olefins having 4 to 12 carbon atoms include 1-butene, 1-pentene, 1-hexene, 4-methyl-1-heptene, 1-octene and 1-decene. 1-Butene, 1-hexene and 1-octene are preferred.

Examples of the copolymer component (A-2-II) include a propylene-ethylene copolymer component, a propylene-ethylene-1-butene copolymer component, a propylene-ethylene-1-hexene copolymer component, a propylene-1-butene copolymer component, and a propylene-1-hexene copolymer component.

The content of the polymer component (A-2-I) in the propylene-based block copolymer (A-2) is 30 to 99% by weight, preferably is 50 to 95% by weight, and more preferably is 50 to 90% by weight.

The content of the polymer component (A-2-II) in the propylene-based block copolymer (A-2) is 1 to 70% by weight, preferably is 5 to 50% by weight, more preferably is 10 to 50% by weight, and even more preferably is 10 to 40% by weight. It is noted that the overall amount of the propylene-based block copolymer (A-2) is let be 100% by weight.

Examples of the propylene-based block copolymer (A-2) which is composed of the polymer component (A-2-I) and the copolymer component (A-2-II) include a (propylene)-(propylene-ethylene)copolymer, a (propylene)-(propylene-ethylene-1-butene)copolymer, a (propylene)-(propylene-ethylene-1-hexene)copolymer, a (propylene)-(propylene-1-butene)copolymer, a (propylene)-(propylene-1-hexene)copolymer, an (propylene-ethylene)-(propylene-ethylene)copolymer, a (propylene-ethylene)-(propylene-ethylene-1-butene)copolymer, a (propylene-ethylene)-(propylene-ethylene-1-hexene)copolymer, a (propylene-ethylene)-(propylene-1-butene)copolymer, a (propylene-ethylene)-(propylene-1-hexene)copolymer, a (propylene-1-butene)-(propylene-ethylene)copolymer, a (propylene-1-butene)-(propylene-ethylene-1-butene)copolymer, a (propylene-1-butene)-(propylene-ethylene-1-hexene)copolymer, a (propylene-1-butene)-(propylene-1-butene)copolymer, and a (propylene-1-butene)-(propylene-1-hexene)copolymer.

From the viewpoint of the mechanical properties and the molding processability of a resin composition and the emitted amount of volatile organic compounds (VOC), the intrinsic viscosity $[\eta]_{A\text{-}2\text{-}I}$, measured at 135° C. in Tetralin, of the polymer component (A-2-I) is 0.1 to 5 dl/g, preferably is from 0.3 to 4 dl/g, and more preferably from is 0.5 to 3 dl/g. From the viewpoint of the mechanical properties and the molding processability of a resin composition, the intrinsic viscosity $[\eta]_{A\text{-}2\text{-}II}$, measured at 135° C. in Tetralin, of the copolymer component (A-2-II) is 1 to 20 dl/g, preferably is from 1 to 15 dl/g, more preferably from is 2 to 10 dl/g, and even more preferably is 2 to 7 dl/g.

From the viewpoint of the mechanical properties and the molding processability of a polypropylene-based resin composition, the ratio of the intrinsic viscosity $[\eta]_{A\text{-}2\text{-}II}$ of the copolymer component (A-2-II) to the intrinsic viscosity $[\eta]_{A\text{-}2\text{-}I}$ of the polymer component (A-2-I), i.e. $[\eta]_{A\text{-}2\text{-}II}/[\eta]_{A\text{-}2\text{-}I}$, preferably is 1 to 20, more preferably is 2-10, and even more preferably is 2 to 8.

The intrinsic viscosities of a propylene homopolymer (A-1), a propylene-based block copolymer (A-2), and a polymer 10, component (A-2-I) in a propylene-based block copolymer (A-2) are determined by the following method. Reduced viscosities are measured at three concentrations of 0.1, 0.2 and 0.5 g/dl using a Ubbelohde's viscometer. The measurement is carried out at a temperature of 135° C. using Tetralin as solvent. An intrinsic viscosity is calculated by a calculation method described in "Kobunshi Yoeki (Polymer Solution), Kobunshi Jikkengaku (Polymer Experiment Study) Vol. 11" page 491 (published by Kyoritsu Shuppan Co., Ltd., 1982), namely, by an extrapolation method in which reduced viscosities are plotted against concentrations and the concentration is extrapolated in zero.

When the propylene-based block copolymer (A-2) is a block copolymer produced a method by which a polymer component (A-2-I) is obtained in a first polymerization step and a copolymer component (A-2-II) is obtained in a second step, the intrinsic viscosity $[\eta]_{A\text{-}2\text{-}I}$ of the polymer component (A-2-I) is measured using a polymer powder taken from the polymerization vessel of the first step. The intrinsic viscosity $[\eta]_{A-2-II}$ of the copolymer component (A-2-II) is calculated by using the contents of the polymer component (A-2-I) and the copolymer component (A-2-II) in the propylene-based block copolymer (A-2), the intrinsic viscosity $[\eta]_{A-2-I}$ of the polymer component (A-2-I) and the intrinsic viscosity $[\eta]_{A-2-Total}$ of the propylene-based block copolymer (A-2).

From the viewpoint of the crystallinity of the propylene-based polymer (A) and the rigidity of a molded article, the mmmm fractions measured by $^{13}C$-NMR of the propylene homopolymer (A-1) and the polymer component (A-2-I) contained in the propylene-based block copolymer (A-2) are 0.96 or more, more preferably are 0.97 or more, and even more preferably are 0.98 or more.

The propylene-based block copolymer (A-2) preferably is a propylene-based block copolymer in which the polymer component (A-2-I) is a homopolymer of propylene.

The propylene-based block copolymer (A-2) more preferably is a block copolymer in which the polymer component (A-2-I) is a propylene homopolymer component and the copolymer component (A-2-II) is a copolymer component of propylene and ethylene, wherein the content of the copolymer component (A-2-II) is 5 to 50% by weight and the content of the units derived from ethylene in the copolymer component (A-2-II) is 20 to 70% by weight.

From the viewpoint of the mechanical properties and the molding processability of a resin composition and the emitted amount of VOC, it is particularly preferable that the propylene-based block copolymer (A-2) be a block copolymer which satisfies the following requirements (e), (f), (g) and (h):

requirement (e): it is a propylene-based block copolymer composed of a polymer component (A-2-I) and a copolymer component (A-2-II), wherein the intrinsic viscosity $[\eta]_{A-2-I}$ of the polymer component (A-2-I) measured at 135° C. in Tetralin is 0.1 to 5 dl/g and the copolymer component (A-2-II) has an intrinsic viscosity $[\eta]_{A-2-II}$ measured at 135° C. in Tetralin of 1 to 20 dl/g;

requirement (f): the mmmm fraction of the polymer component (A-2-I) measured by $^{13}C$-NMR is 0.98 or more;

requirement (g): the content of the at least one monomer selected from the group consisting of ethylene and α-olefins having 4 to 12 carbon atoms in the copolymer component (A-2-II) is 1 to 80% by weight, where the overall amount of the polymer component (A-2-II) is let be 100% by weight;

requirement (h): the content of the copolymer component (A-2-II) is 1 to 70% by weight, where the overall amount of the propylene-based block copolymer is let be 100% by weight.

The propylene-based polymer (A) to be used for the present invention can be produced by using a known polymerization catalyst and a known polymerization method.

Examples of the polymerization catalyst include Ziegler type catalyst systems, Ziegler-Natta type catalyst systems, catalyst systems composed of an alkyl aluminoxane and a Group 4 transition metal compound having a cyclopentadienyl ring, catalyst systems composed of an organoaluminum compound, a compound of a transition metal of Group 4 of the periodic table which compound has a cyclopentadienyl ring, and a compound capable of reacting with the compound of the transition metal to form an ionic complex, and catalyst systems obtained by treating such catalyst systems in the presence of particles of inorganic substance. A prepolymerized catalyst which is prepared by prepolymerizing ethylene or α-olefin in the presence of any of the aforesaid catalyst systems may also be used.

Specific examples of the catalyst systems include those disclosed in JP 61-218606 A, JP 5-194685 A, JP 7-216017 A, JP 10-212319 A, JP 2004-182981 A and JP 9-316147 A.

Examples of the known polymerization method include liquid phase polymerization, solution polymerization, slurry polymerization, or gas phase polymerization. Bulk polymerization is a method by which polymerization is carried out using, as a medium, an olefin which is liquid at the polymerization temperature. Both the solution polymerization and the slurry polymerization are methods by which polymerization is carried out in an inert hydrocarbon solvent such as propane, butane, isobutane, pentane, hexane, heptane, and octane. The gas phase polymerization is a method in which a gaseous monomer is used as a medium and a gaseous monomer is polymerized in the medium. Such polymerization methods maybe carried out either in a batch system or in a continuous system and a plurality of polymerization methods may be combined appropriately. From the industrial and economical point of view and from the viewpoint of reducing the emitted amount of VOC by failing, as much as possible, to use an inert hydrocarbon solvent to reduce volatile organic compounds which remain in the propylene-based polymer (A), the method for producing the propylene-based polymer (A) preferably is a continuous gas phase polymerization method or a liquid phase-gas phase polymerization method by which liquid phase polymerization and gas phase polymerization are carried continuously.

The method for producing the propylene-based block copolymer (A-2) is a method by which a propylene-based block copolymer is produced in at least two steps. The method is preferably a method having two or more steps including at least a step of producing a polymer component (A-2-I) and a step of producing a copolymer component (A-2-II) which is different from the polymer component (A-2-I).

Examples of the method for producing the propylene-based block copolymer (A-2) in two or more steps include the multiple-step polymerization methods disclosed in JP 5-194685 A and JP 2002-12719 A.

The conditions of each polymerization step (polymerization temperature, polymerization pressure, monomer concentration, amount of catalyst to be charged, polymerization time, etc.) may be determined depending on the performance of a desired propylene-based block copolymer.

When the combined amount of the propylene-based polymer (A) and the inorganic filler (B) contained in the polypropylene resin composition of the present invention is let be 100 parts by weight, the amount of the propylene-based polymer (A) is 60 to 99 parts by weight, preferably 65 to 95 parts by weight, and more preferably 70 to 90 parts by weight in view of the rigidity or the impact strength of a molded article.

From the viewpoint of the emitted amount of volatile organic compounds (VOC) and the mechanical properties of a molded article and in particular the fluidity of a resin composition exhibited at the time of its injection molding, the MFR of the propylene-based polymer (A) measured at a temperature of 230° C. and a load of 2.16 kgf in accordance with JIS K6758 is 1 to 200 g/10 min, preferably is 10 to 200 g/10 min, more preferably is 20 to 100 g/10 min, and even more preferably 20 to 70 g/10 min.

The propylene-based polymer (A) may be a polymer obtained by the above-described method, or alternatively may be a polymer obtained by subjecting a polymer obtained by the above-described method to decomposition treatment by adding an organic peroxide, followed by melt-kneading.

Examples of the organic peroxide include alkyl peroxides, diacyl peroxides, peroxyesters and peroxycarbonates. Examples of the alkyl peroxides include dicumyl peroxide, di-tert-butyl peroxide, di-tert-butyl cumyl peroxide, 2,5-dimethyl-2,5-di -(tert-butylperoxy)hexane, 2,5-dimethyl-2,5-di-(tert-butylperoxy)hexyne-3, tert-butyl cumyl peroxide, 1,3-bis(tert-butylperoxyisopropyl)benzene, and 3,6,9-triethyl-3,6,9-trimethyl-1,4,7-triperoxonane.

Examples of the diacyl peroxides include benzoyl peroxide, lauroyl peroxide, and decanoyl peroxide. Examples of the peroxyesters include 1,1,3,3-tetramethylbutyl peroxyneodecanoate, α-cumyl peroxyneodecanoate, tert-butyl peroxyneodecanoate, tert-butyl peroxyneoheptanoate, tert-butyl peroxypivalate, tert-hexyl peroxypivalate, 1,1,3,3-tetramethylbutyl peroxy-2-ethylhexanoate, tert-amyl peroxy-2-ethylhexanoate, tert-butyl peroxy-2-ethylhexanoate, tert-butyl peroxyisobutyrate, di-tert-butyl peroxyhexahydroterephthalate, tert-amyl peroxy-3,5,5-trimethylhexanoate, tert-butyl peroxy-3,5,5-trimethyl hexanoate, tert-butyl peroxyacetate, tert-butyl peroxybenzoate, and di-tert-butyl peroxytrimethyladipate.

Examples of the peroxycarbonates include di-3-methoxybutyl peroxydicarbonate, di(2-ethylhexyl) peroxydicarbonate, diisopropyl peroxydicarbonate, tert-butyl peroxyisopropylcarbonate, di(4-tert-butylcyclohexyl) peroxydicarbonate, dicetyl peroxydicarbonate, and dimyristyl peroxydicarbonate.

The organic peroxide preferably is an alkyl peroxide, and particularly preferably is 2,5-dimethyl-2,5-di-(tert-butylperoxy)hexane, 1,3-bis(tert-butylperoxyisopropyl)benzene, or 3,6,9-triethyl-3,6,9-trimethyl-1,4,7-triperoxonane.

The used amount of the organic peroxide generally is 0.0001 to 0.5 parts by weight to 100 parts by weight of the propylene-based copolymer to be treated. It preferably is 0.0005 to 0.3 parts by weight, and more preferably is 0.001 to 0.1 parts by weight. It is preferable to adjust the used amount of the organic peroxide depending on the purpose because if it is added too much, the emitted amount of volatile organic compounds (VOC) released from a resulting resin composition may increase while the molding processability of the resin composition will be improved to some extent.

The organic peroxide may be added as received or alternatively may be added in the form of a powder (masterbatch) prepared by mixing it with a powder of the propylene-based copolymer (A) or a powder of a polypropylene resin different from the copolymer (A) at an arbitrary concentration or by impregnating a powder of the propylene-based copolymer (A) or a powder of a propylene resin different from the copolymer (A) with the organic peroxide at an arbitrary concentration.

From the viewpoint of the emitted amount of volatile organic compounds (VOC) and mechanical properties of a molded article and in particular the fluidity of a resin composition exhibited at the time of its molding, which is required in the production of large-scale molded articles, such as automotive components, the MFR of the polypropylene resin composition of the present invention measured at a temperature of 230° C. and a load of 2.16 kgf in accordance with JIS K6758 is 5 to 200 g/10 min, preferably is 10 to 200 g/10 min, more preferably is 15 to 100 g/10 min, and even more preferably 20 to 90 g/10 min.

<Inorganic filler (B)>

The inorganic filler (B) which can be used for the present invention is, for example, a non-fibrous inorganic filler, a fibrous inorganic filler, or a mixture thereof. Examples of the non-fibrous inorganic filler include talc, mica, cubic calcium carbonate, spindle-shaped calcium carbonate, columnar calcium carbonate, tabulate barium sulfate, columnar barium sulfate, granular magnesium carbonate, clay, granular alumina, spherical silica, granular calcium sulfate, silica sand, carbon black, spherical titanium oxide, spherical magnesium hydroxide, columnar magnesium hydroxide, zeolite, diatomaceous earth, sericite, "Shirasu" ignimbrite, spherical calcium hydroxide, spherical calcium sulfite, spherical sodium sulfate, bentonite, and spherical graphite.

Examples of the fibrous inorganic filler include fibrous magnesium oxysulfate, fibrous potassium titanate, fibrous magnesium hydroxide, fibrous aluminum borate, fibrous calcium silicate, fibrous calcium carbonate, carbon fiber, glass fiber, and metal fiber.

Talc, mica, spindle-shaped calcium carbonate, silica, fibrous magnesium oxysulfate, and fibrous wollastonite are preferable, and talc and fibrous magnesium oxysulfate are more preferable. Such inorganic fillers may be used in combination.

The average particle diameter of the inorganic filler (B) preferably is 0.01 to 100 μm, more preferably is 0.1 to 50 μm, and even more preferably is 0.1 to 20 μm. The average particle diameter of a non-fibrous inorganic filler is 20 μm or less, and preferably is 10 μm or less. The average particle diameter of a non-fibrous inorganic filler as referred to herein is a 50%-equivalent particle diameter D50, which is determined from an integral distribution curve produced by a laser diffraction method using a Microtrac particle size analyzer (SPA system) manufactured by Nikkiso Co., Ltd., after a 10-minute dispersion of a sample in an ethanol solution carried out by the use of an ultrasonic washer.

Fibrous inorganic fillers preferably have an average fiber diameter of 0.2 to 1.5 μm, an average fiber length of 5 to 30 μm, and an average aspect ratio of 10 to 50.

The average fiber diameter, the average fiber length, and the average aspect ratio of a fibrous inorganic filler can be determined by randomly selecting 50 or more fibrous fillers in an image resulting from a scanning electron microscope (SEM) observation, subsequently measuring fiber diameters, fiber lengths or aspect ratios, and then calculating an average. The aspect ratio is the ratio of the fiber length to the fiber diameter.

The inorganic filler (B) may be used without being subjected to any treatment or alternatively may be used after treatment of the surface of the inorganic filler (B) with a silane coupling agent, a titanium coupling agent, a higher fatty acid, a higher fatty ester, a higher fatty amide, a salt of a higher fatty acid, or other surfactants known in the art in order to improve the interfacial adhesion with a propylene-based resin or to improve the dispersibility of the inorganic filler (B) in a resin composition.

From the viewpoint of the rigidity and the impact resistance of a molded article, the content of the inorganic filler (B) is 1 to 40 parts by weight, preferably is 5 to 35 parts by weight, and more preferably is 7 to 25 parts by weight, wherein the total amount of polypropylene resin composition of the present invention is 100 parts by weight.

<Hindered Amine Light Stabilizer (C)>

The hindered amine light stabilizer (C) to be used in the present invention is a compound which satisfies the following requirements (a), (b), and (c):

requirement (a): the light stabilizer has a 2,2,6,6-tetramethylpiperidyl group represented by formula (I);

requirement (b): the light stabilizer has an acid dissociation constant (pka) of less than 8;

requirement (c): the light stabilizer exhibits a weight loss, as measured in an thermogravimetric analysis at a measurement temperature of 300° C. under a nitrogen gas atmosphere, of less than 10% by weight.

The hindered amine light stabilizer (C) preferably further satisfies requirement (d): the molecular weight is 1000 or more.

Regarding requirement (a), from the viewpoint of stability against light, the 2,2,6,6-tetramethylpiperidyl group represented by formula (I) (i.e., a 2,2,6,6-tetramethyl-4-piperidyl group) preferably is attached to either an oxygen atom or a nitrogen atom in the compound having the group, and more preferably is attached to a nitrogen atom. Regarding requirements (b), from the viewpoint of the stability against light and the hue stability of a resin composition, the hindered amine light stabilizer (C) preferably has an acid dissociation constant (pka) of less than 8, and more preferably has a pka of 7 or less. The acid dissociation constant (pka) is an index which shows an intrinsic property of a compound having a 2,2,6,6-tetramethylpiperidyl group represented by formula (I) and it is determined by conventional titration.

Regarding requirement (c), from the viewpoint of the staining of a mold, the emitted amount of VOC, and the stability against photodegradation, the weight loss measured in a thermogravimetric analysis at a temperature of 300° C. under a nitrogen gas atmosphere preferably is less than 5% by weight, and more preferably is less than 3% by weight. The weight loss measured by the thermogravimetric analysis of a hindered amine light stabilizer (C) is a value determined by using a thermo gravimetry differential thermal analyzer (TG-DTA). Described concretely, it is a weight loss rate determined using a thermobalance when the temperature of a hindered amine light stabilizer (C) is increased from room temperature to 300° C. at a rate of 10° C. per minute under a nitrogen gas atmosphere (in a nitrogen flow at a flow rate of 100 ml/min).

Regarding requirement (d), the molecular weight of the hindered amine light stabilizer (C) preferably is 1500 or more, and more preferably is 2000 or more from the viewpoint of the staining of a mold, the emitted amount of VOC and the stability against light.

The hindered amine light stabilizer (C) preferably is a copolymer represented by formula (II) which is made from a maleic acid imide derivative:

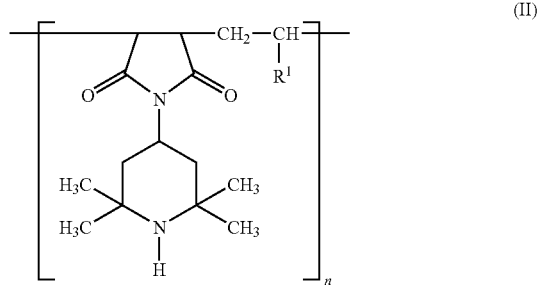

(II)

wherein $R^1$ represents an alkyl group having 10 to 30 carbon atoms and n represents an integer larger than 1.

The hindered amine light stabilizer (C) preferably is a light stabilizer represented by formula (II) wherein $R^1$ is an alkyl group having 14 to 28 carbon atoms, more preferably is a light stabilizer represented by formula (II) wherein $R^1$ is an alkyl group having 16 to 26 carbon atoms, and even more preferably is a light stabilizer represented by formula (II) wherein $R^1$ is an alkyl group having 18 to 22 carbon atoms. Such an alkyl group may be either a group having a linear structure or a group having a cyclic structure. Preferred is a linear alkyl group.

From the viewpoint of the stability against light or mold staining property of a resin composition and the balance between the appearance and the physical properties of a molded article, the content of the hindered amine light stabilizer (C) in the polypropylene resin composition is 0.05 to 5 parts by weight, preferably is 0.05 to 0.5 parts by weight, and more preferably is 0.1 to 0.3 parts by weight to 100 parts by weight of the propylene-based polymer (A) and the inorganic filler (B) in total.

The hindered amine light stabilizer (C) may be use together with another light stabilizer (including hindered amine light stabilizers which fail to satisfy any of the requirements (a), (b) and (c)).

<Ethylene-α-Olefin Polymer (D)>

In view of the impact resistance of a molded article, the polypropylene resin composition according to the present invention may further contain an ethylene-α-olefin copolymer (D).

From the viewpoint of the rigidity, the hardness or the impact resistance of a molded article, the density of the ethylene-α-olefin copolymer (D) is 0.85 to 0.91 g/cm$^3$, preferably is 0.85 to 0.88 g/cm$^3$, and more preferably is 0.855 to 0.875 g/cm$^3$.

From the viewpoint of the impact strength, especially the low temperature impact strength, of a molded article, the content of ethylene contained in the ethylene-α-olefin copolymer (D) preferably is 5 to 95% by weight, and more preferably is 10 to 90% by weight.

From the viewpoint of the fluidity of a resin composition at the time of its molding, or the balance between the rigidity and the impact resistance of a molded article, the MFR, measured by a temperature of 230° C. and a load of 2.16 kgf according to JIS K-7210, of the ethylene-α-olefin copolymer (D) is 0.05 to 100 g/10 min, preferably is 0.1 to 50.0 g/10 min, and more preferably is 0.1 to 30 g/10 min.

Examples of the α-olefin which can be used for forming the ethylene-α-olefin copolymer (D) include α-olefins having 3 to 20 carbon atoms, and specific examples thereof include propylene, 1-butene, 1-pentene, 1-hexene, 4-methyl-1-pentene, 1-heptene, 1-octene, 1-decene, 1-dodecene, 1-tetradecene, 1-hexadecene, and 1-eicocene. Such α-olefins may be used singly or in combination. Among these, it is more preferable to use α-olefins having 4 to 8 carbon atoms, such as 1-butene, 1-hexene, and 1-octene.

Examples of the ethylene-α-olefin copolymer (D) include ethylene-propylene random copolymer rubber, ethylene-butene-1 random copolymer rubber, ethylene-hexene-1 random copolymer rubber, and ethylene-octene-1 random copolymer rubber. Ethylene-octene-1 random copolymer rubber or ethylene-butene-1 random copolymer rubber is preferred. Two or more kinds of ethylene-α-olefin random copolymer rubbers may be used in combination.

The method for producing the ethylene-α-olefin copolymer (D) may be a method such that it is produced by copolymerizing ethylene and an α-olefin using a conventional catalyst and a conventional polymerization method.

Examples of the conventional catalyst include catalyst systems comprising vanadium compounds and organoaluminum compounds, Ziegler-Natta catalyst systems, and metallocene catalyst systems. Examples of the conventional polymerization method include solution polymerization slurry polymerization, high-pressure ion polymerization and gas phase polymerization.

Examples of such a metallocene catalyst include metallocene catalysts disclosed in JP 3-163088 A, JP 4-268307 A, JP 9-12790 A, JP 9-87313 A, JP 11-80233 A and JP 10-508055 A.

A preferable example of the method for producing the ethylene-α-olefin copolymer (D) using a metallocene catalyst is the method disclosed in EP 1211287A.

From the viewpoint of the rigidity and the heat resistance of a molded article, the content of the ethylene-α-olefin copolymer (D) in the polypropylene resin composition according to the present invention preferably is 1 to 50 parts by weight, more preferably 3 to 40 parts by weight, and, particularly preferably is 5 to 30 parts by weight to 100 parts by weight of the propylene-based polymer (A) and the inorganic filler (B) in total.

<Others>

In order to further improve the balance of mechanical properties, the polypropylene resin composition of the present invention may contain a vinyl aromatic compound-containing rubber. Examples of the vinyl aromatic compound-containing rubber include block copolymers composed of a vinyl aromatic compound polymer and a conjugated diene-based polymer and hydrogenated products of such block copolymers. The hydrogenation ratio of the double bonds of the conjugated diene polymers preferably is 80% by weight or more, and more preferably is 85% by weight or more, provided that the amount of all the double bonds contained in the conjugated diene polymer moieties is let be 100% by weight.

The molecular weight distribution, measured by GPC, of the vinyl aromatic compound-containing rubber preferably is 2.5 or less, and more preferably is 1 to 2.3.

The content of the vinyl aromatic compound contained in the vinyl aromatic compound-containing rubber is preferably from 10 to 20% by weight, and more preferably from 12 to 19% by weight, based on the weight of the vinyl aromatic compound-containing rubber, provided that the amount of all the rubbers containing vinyl aromatic compounds is let be 100% by weight.

The MFR, measured at a temperature of 230° C. and a load of 2.16 kgf in accordance with JIS K7120, of the vinyl aromatic compound-containing rubber preferably is 0.01 to 15 g/10 min, and more preferably is 0.03 to 13 g/10 min. Examples of the vinyl aromatic compound-containing rubber include block copolymers such as styrene-ethylene-butene-styrene rubbers (SEBS), styrene-ethylene-propylene-styrene rubbers (SEPS), styrene-butadiene rubbers (SBR), styrene-butadiene-styrene rubbers (SBS) and styrene-isoprene-styrene rubbers (SIS), and hydrogenated block copolymers produced by hydrogenation of the block copolymers listed above. Moreover, rubbers produced by causing a vinyl aromatic compound such as styrene to react with an ethylene-propylene-nonconjugated diene rubber (EPDM) are also mentioned as examples. Two or more vinyl aromatic compound-containing rubbers may be used in combination.

The method for producing the vinyl aromatic compound-containing rubber is, for example, a method comprising linking a vinyl aromatic compound to an olefin-based copolymer rubber or a conjugated diene rubber by polymerization or reaction.

The polypropylene resin composition of the present invention may contain one or more additives unless the effect of the present invention is inhibited remarkably. Examples of such additives include neutralizing agents, antioxidants, processing stabilizers, UV absorbers, nucleating agents, transparentizable nucleating agents, antistatic agents, lubricants, processing aids, metallic soap, colorants (pigments such as carbon black and titanium oxide), foaming agents, antimicrobial agents, plasticizers, flame retarders, crosslinking agents, crosslinking aids, brightening agents, etc. are mentioned.

In particular, an antioxidants is preferably used, and examples thereof include phenolic antioxidants, phosphorus-containing antioxidants, sulfur-containing antioxidants and hydroxylamine-based antioxidants. In particularly preferable embodiments, a phenolic antioxidant is used.

A phenolic antioxidant having a molecular weight of 300 or more is used preferably as a phenolic antioxidant, and examples thereof include tetrakis[methylene-3-(3′,5′-di-tert-butyl-4-hydroxyphenyl)propionate]methane, octadecyl-3-(3,5-di-tert-butyl-4-hydroxyphenyl)propionate, 3,9-bis[2-{3-(3-tert-butyl-4-hydroxy-5-methylphenyl)propionyloxy}-1,1-dimethylethyl]-2,4,8,10-tetraoxaspiro[5.5]undecane, triethylene glycol-N-bis-3-(3-tert-butyl-5-methyl-4-hydroxyphenyl)propionate, 1,6-hexanediol bis[(3-(3,5-di-tert-butyl-4-hydroxyphenyl)propionate)], 2,2-thiobis-diethylene bis[(3-(3,5-di-tert-butyl-4-hydroxyphenyl)propionate)], 1,3,5-tris-2[3(3,5-di-tert-butyl-4-hydroxyphenyl)propionyloxy]ethyl isocyanate, 1,3,5-trimethyl-2,4,6-tris(3,5-di-tert-butyl-4-hydroxybenzyl)benzene, tris(3,5-di-tert-butyl-4-hydroxybenzyl)isocyanurate, and 1,3,5-tris (4-tert-butyl-3-hydroxy-2,6-dimethylbenzyl)isocyanurate.

From the viewpoint of the anti-mold staining property, the emitted amount of volatile organic compounds (VOC), the thermal stability, the stability against light, the moldability, and the hue stability of a resin composition, 3,9-bis[2-{3-(3-tert-butyl-4-hydroxy-5-methylphenyl)propionyloxy}-1,1-dimethylethyl]-2,4,8,10-tetraoxaspiro[5.5]undecane and tris (3,5-di-tert-butyl-4-hydroxybenzyl)isocyanurate are used preferably.

While the added amount of the phenolic antioxidant may be determined arbitrarily, it ordinarily is 0.01 to 1 part by weight to 100 parts by weight of the polypropylene-based resin composition (I).

When a fatty acid metal salt is incorporated in the polypropylene resin composition of the present invention for the purpose of improvement in the processability or the improvement in the dispersibility of coloring pigments (pigments such as carbon black and titanium oxide), the content of the fatty acid metal salt preferably is 0.01 to 0.5 parts by weight, and more preferably is 0.01 to 0.2 parts by weight to 100 parts by weight of the polypropylene resin composition (I) from the viewpoint of inhibiting mold staining. Examples of the fatty acid metal salt include calcium stearate, magnesium stearate, and zinc stearate.

In order to improve the stability against thermal oxidation and stability against light, it is preferable to incorporate a fatty acid amide selected from among fatty acid monoamides and fatty acid bisamides into the polypropylene resin composition of the present invention. Examples of fatty acid amides which can be used include lauric acid amide, stearic acid amide, oleic amide, behenic acid amide, erucic acid amide, methylene bis stearyl amide, ethylene bis stearyl amide, ethylene bis oleyl amide, hexamethylene bis stearyl amide. The added amount of the fatty acid amide is 0.01 to 0.2 parte by weight, and preferably is 0.01 to 0.1 parts by weight to 100 parts by weight of the polypropylene resin composition (I). In a system containing an inorganic filler, the incorporation of a fatty acid amide can greatly improve the stability against thermal oxidation and the stability against light.

[Method for Producing Olypropylene Resin Composition]

The polypropylene resin composition of the present invention can be produced by a method comprising melt-kneading its ingredients together, for example, a method using a kneading machine such as a single screw extruder, a twin screw extruder, a Banbury mixer, and a hot roll. Examples of the melt-kneading machine to be used include single screw extruders, co-rotating twin screw extruders (e.g., ZSK [registered trademark] manufactured by Werner Pfleiderer, TEM [registered trademark] manufactured by Toshiba Machine Co., Ltd., TEX [registered trademark] manufactured by The Japan Steel Works, Ltd., and a twin screw kneader manufactured by Technovel Corporation.), counter-rotating twin screw extruders (e.g., CMP [registered trademark], TEX [registered trademark] manufactured by The Japan Steel Works, Ltd., FCM [registered trademark], NCM [registered trademark] and LCM [registered trademark] manufactured by Kobe Steel, Ltd.).

The polypropylene resin composition of the present invention can be prepared, for example, by melt-mixing a propylene-based polymer (A), an inorganic filler (B) and, according to necessity, additives together at a temperature of 170° C. or higher, and causing a resulting molten mixture to pass through a filter. In order to reduce the emitted amount of volatile organic compounds (VOC) from a molded article made of a polypropylene resin composition, the temperature at which the melt-mixing is performed preferably is not lower than 180° C. but lower than 300° C., and more preferably is not lower than 180° C. but lower than 270° C. The melt-kneading time ordinarily is 1 to 20 minutes.

The kneading of the ingredients may be performed either simultaneously or sequentially. Examples of the method of kneading the ingredients separately include the following methods (1), (2), and (3):

(1) A method in which a propylene polymer (A) is kneaded and extruded to give pellets and then the pellets are kneaded with an inorganic filler (B) and a hindered amine light stabilizer (C);

(2) A method in which a propylene polymer (A) and an inorganic filler (B) are kneaded together and extruded to give pellets and then the pellets are kneaded with a hindered amine light stabilizer (C); and (3) A method in which a propylene-based polymer (A) and a hindered amine light stabilizer (C) are kneaded together and extruded to give pellets and then the pellets are kneaded with an inorganic filler (B).

In each of the above-mentioned methods, a propylene homopolymer (A-1) and/or an ethylene-α-olefin copolymer (D), and/or other additives may be added.

A method for incorporating the hindered amine light stabilizer (C) efficiently during the production of the polypropylene resin composition of the present invention includes a method in which a masterbatch resulting from melt-mixing the propylene-based copolymer (A) and the hindered amine light stabilizer (C) to be used for the present invention or a high-concentration granule of the hindered amine light stabilizer (C) containing the hindered amine light stabilizer (C) at a concentration of 10 to 90% by weight resulting from the uniform mixing of the hindered amine light stabilizer (C), one or more additives and/or a polypropylene-based resin composed of a propylene-based polymer such as the propylene-based polymer (A) to be used for the present invention is prepared first, and then the masterbatch or the granule is incorporated into a polypropylene-based resin composition (I) to be used for the present invention.

The form of the polypropylene resin composition of the present invention includes a strand form, a sheet form, a flat plate form, and a pellet form obtained by cutting a strand into a desired length. In order to apply the polypropylene resin composition of the present invention to molding, it is preferable, from the viewpoint of the production stability of molded articles to be obtained, that the composition be in the form of pellets having a length of from 1 to 50 mm.

[Method for Producing Molded Article]

A molded article can be produced from the polypropylene resin composition of the present invention using various molding methods. The shape, size, etc. may be determined appropriately.

Examples of the method for producing a molded article include injection molding, press molding, vacuum forming, foam molding and extrusion forming, which are usually used in industry. Depending upon the purpose, a forming method may be employed in which the polypropylene resin composition of the present invention is laminated or co-extruded with a polypropylene resin which is similar to or different from the polypropylene resin composition or with other resins.

The molded article produced from the polypropylene resin composition of the present invention preferably is an injection molded article. The injection molding method includes normal injection molding, injection foam molding, supercritical injection foam molding, ultrahigh speed injection molding, injection compression molding, gas-assist injection molding, sandwich molding, sandwich foam molding and insert/outsert molding.

Examples of the application of a molded article include automotive materials, household electric appliance materials, and building materials.

The polypropylene resin composition of the present invention and molded articles produced therefrom are used preferably for applications including automotive materials and building materials (especially, products wide in surface area which are placed in a human living space) from the viewpoint of the emitted amount of volatile organic compounds (VOC).

Examples of the automotive components include interior components such as door trims, pillars, instrument panels, consoles, locker panels, arm rests, door panels and spare tire covers; exterior components such as bumpers, spoilers, fenders and side steps; other components such as air-intake ducts, coolant reserve tanks, fender liners, sirocco fans, air conditioner housing, fan shrouds, and under deflectors; and integrated components such as front end panels.

Examples of components of household electric appliances include components of clothes washers (outer tanks), drying machine components, vacuum cleaner components, rice cooker components, electric pot components, heat insulator components, dish washer components, air cleaner components, air conditioner components and lighting fixture components.

The building materials include indoor floor materials, wall materials and window frames.

EXAMPLES

The present invention is further described below with reference to Examples and Comparative Examples. The propylene-based block copolymers and the additive which were used in Examples and Comparative Examples are shown below.

(1) Propylene-Based Polymer (Component (A))

(A-1) Propylene Homopolymer

A propylene homopolymer having a molecular weight distribution of 4.2, an intrinsic viscosities $[72]_p$ of 1.45 dl/g, an isotactic pentad fraction of 0.97, and an MFR (230° C.) of 13 g/10 min was used.

(A-2) Propylene-(propylene-ethylene) block copolymer

A block copolymer composed of a propylene homopolymer component (polymer component (I)) and a propylene-ethylene random copolymer component (polymer component (II))

MFR of the block copolymer: 52 g/10 min

Ethylene content of the block copolymer: 4.2% by weight

Intrinsic viscosity of the block copolymer $[\eta]_{total}$: 1.4 dl/g $[\eta]_{II}/[\eta]_{I}=5.43$ Polymer component (I): Propylene homopolymer component Molecular weight distribution of polymer-component (I): 4.2

Isotactic pentad fraction of polymer component (I): 0.97

Intrinsic viscosity NI of polymer component (I): 0.92 dl/g

Polymer component (II): Propylene-ethylene random copolymer component

Content of polymer component (II): 13% by weight

Ethylene content of polymer component (II): 32% by weight

Intrinsic viscosity of polymer component (II): 5.0 dl/g (A-3) Propylene-(Propylene-Ethylene) Block Copolymer MFR of the block copolymer: 26 g/10 min Ethylene content of the block copolymer: 7.0% by weight Intrinsic viscosity $[\eta]_{total}$ of the block copolymer: 1.4 dl/g $[\eta]_{II}/[\eta]_{I}=2.52$ Polymer component (I) Propylene homopolymer component Isotactic pentad fraction of polymer component (I): 0.983

Intrinsic viscosity of polymer component (I) $[\eta]_I$: 1.07 dl/g

Polymer component (II): Propylene-ethylene random copolymer component

Content of polymer component (II): 20% by weight

Ethylene content of polymer component (II): 35% by weight

Intrinsic viscosity $[\eta]_{II}$ of polymer component (II): 2.7 dl/g (2) Inorganic Filler (B)

(B-1) Talc (MWHST produced by Hayashi Kasei Co., Ltd.; average particle diameter: 4.9 μm)

(B-2) Talc (JR63 produced by Kami Talc Co., Ltd.; average particle diameter: 5.3 μm)

(B-3) Talc (SM-P produced by Hayashi Kasei Co., Ltd.; average particle diameter: 8.9 μm)

(B-4) Fibrous magnesium oxysulfate (MOS-HIGE A produced by Ube Material Industries, Ltd.; average fiber diameter: 0.5 μm, average fiber length: 10 μm, aspect ratio: 20)

(3) Hindered Amine Light Stabilizer (Component (C))

(C-1)

Product name: UVINUL 5050H, produced by BASF Japan, Ltd.

Sterically hindered amine oligomer "Copolymer of N-(2,2,6,6-tetramethyl-4-piperidyl)maleic imide with C20-24 α-olefins"

Structural formula:

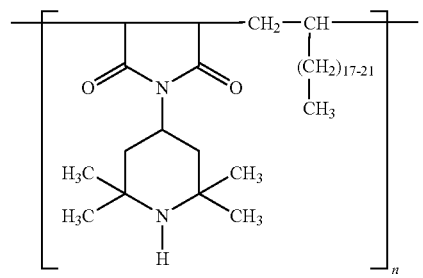

Molecular weight: 3500 pKa: 7.0

Weight loss by thermogravimetric analysis (TG-DTA): 2.2% by weight (C-2)

Commercial Name Adk Stab La52, Manufactured by ADEKA Corporation

Chemical name: Tetrakis(1,2,2,6,6-pentamethyl-4-piperidyl) 1,2,3,4-butanetetracarboxylate Structural formula:

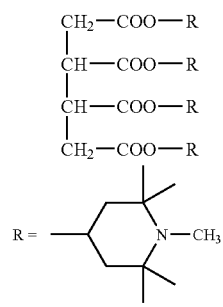

Molecular weight: 847 pKa 8.9

Weight loss by thermogravimetric analysis (TG-DTA): 5.8% by weight (C-3)

Product Name: SUMISORB 400, produced by Sumitomo Chemical Co., Ltd.

Chemical name: 2,4-Di-tert-butylphenyl 3,5-di-tert-butyl-4-hydroxybenzoate

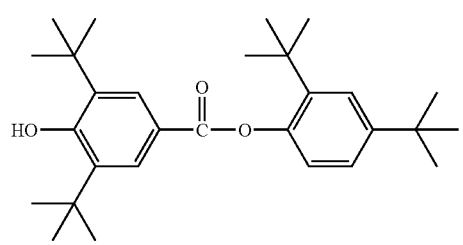 [SMILES: CC(C)(C)c1ccc(OC(=O)c2cc(C(C)(C)C)c(O)c(C(C)(C)C)c2)c(C(C)(C)C)c1]

Molecular weight: 439

Weight loss by thermogravimetric analysis (TG-DTA): 31.6% by weight (C-4)
  Product name: UV3346, produced by Sytec Corporation.
  Chemical name: Poly[(6-morpholino-s-triazine-2,4-diyl)[(2,2,6,6-tetramethyl-4-piperidyl)imino]-hexamethylene-[(2,2,6,6-tetramethyl-4-piperidyl)imino]]
  Structural formula:

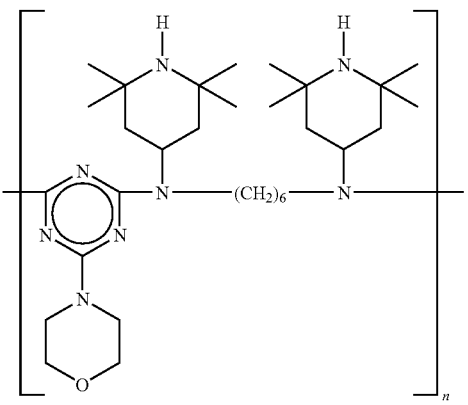

Molecular weight: 1600
pKa: 9.0
Weight loss by thermogravimetric analysis (TG-DTA): 1.9% by weight
(C-5)
Product Name: CHIMASSORB 119FL, produced by Ciba Specialty Chemicals Co., Ltd.
  Chemical name: Condensate of N,N-bis(3-aminopropyl)ethylenediamine-2,4-bis[N-butyl-N-(1,2,2,6,6-pentamethyl-4-piperidyl)amino]-6-chloro-1,3,5-triazine
  Structural formula:

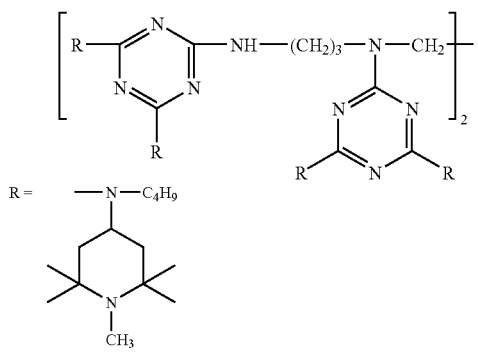

Molecular weight: 2300
pKa: 9.2
Weight loss by thermogravimetric analysis (TG-DTA): 0.6% by weight
The weight loss by thermogravimetric analysis (TG-DTA) of a hindered amine light stabilizer was measured with a thermo gravimetry differential thermal analyzer from room temperature to 300° C. at a temperature increasing rate of 10° C./min under a nitrogen gas atmosphere (100 ml/min).
(4) Ethylene-α-Olefin Copolymer (D)
(D-1) Ethylene-1-octene random copolymer
  ENGAGE 8842 produced by DuPont Dow Elastomer (density: 0.858 g/cm³, MFR (230° C.): 2 g/10 min)
(D-2) Ethylene-1-octene random copolymer
  ENGAGE 8200 produced by DuPont Dow Elastomer (density: 0.870 g/cm³, MFR (230° C.): 8 g/10 min)

The physical properties of propylene-based polymers (Component A) and polypropylene resin compositions were measured in accordance with the test methods shown below.
(1) Melt Flow Rate (MFR)
  MFR was measured in accordance with the method provided in JIS K6758 at a temperature of 230° C. and a load of 2.16 kgf.
(2) Intrinsic Viscosity
  Reduced viscosities were measured at three concentrations of 0.1, 0.2 and 0.5 g/dl using a Ubbelohde's viscometer. The intrinsic viscosity was calculated by the calculation method described in "Kobunshi Yoeki (Polymer Solution), Kobunshi Jikkengaku (Polymer Experiment Study) Vol. 11" page 491 (published by Kyoritsu Shuppan Co., Ltd., 1982), that is, by an extrapolation method by which reduced viscosities are plotted against concentrations and the concentration is extrapolated in zero. The measurement was carried out at a temperature of 135° C. using Tetralin as solvent. A polymer powder taken out from a polymerization reactor was used as a sample. In the case of the polymer component (A-2-I) of a propylene-based block copolymer, the intrinsic viscosity of a polymer powder taken out from a polymerization vessel of the first step was measured, and the resulting measurement was let be $[\eta]_{A\text{-}2\text{-}I}$.
(3) Measurement And Calculation of Proportions And Intrinsic Viscosities ($[\eta]_{A\text{-}2\text{-}Total}$, $[\eta]_{A\text{-}2\text{-}I}$, $[\eta]_{A\text{-}2\text{-}II}$) of Polymer Component (A-2-I) and Copolymer Component (A-2-II) in a Propylene-Based Block Copolymer
  The intrinsic viscosity $[\eta]_{A\text{-}2\text{-}II}$ of a copolymer component (A-2-II) produced in the second step was calculated from the formula given below by using the intrinsic viscosity $[\eta]_{A\text{-}2\text{-}I}$ of a polymer component (A-2-I) obtained in the first polymerization step, the intrinsic viscosity $[\eta]_{A\text{-}2\text{-}Total}$ of a final polymer after the second polymerization step, namely the combination of the components (A-2-I) and (A-2-II), measured by the method described in the foregoing (2), and the content (weight proportion) of the copolymer component (A-2-II) produced in the second step in the final polymer:

$$[\eta]_{A\text{-}2\text{-}II} = \{[\eta]_{A\text{-}2\text{-}Total} - ([\eta]_{A\text{-}2\text{-}I} \times X_{A\text{-}2\text{-}I})\}/X_{A\text{-}2\text{-}II}$$

$[\eta]_{A\text{-}2\text{-}Total}$: the intrinsic viscosity (dl/g) of the final polymer after the second polymerization step
$[\eta]_{A\text{-}2\text{-}I}$: the intrinsic viscosity (dl/g) of a polymer powder taken out from a polymerization vessel after the first polymerization step
$X_{A\text{-}2\text{-}I}$: the weight proportion of the component produced in the first step
$X_{A\text{-}2\text{-}II}$: the weight proportion of the component produced in the second step
$X_{A\text{-}2\text{-}I}$ and $X_{A\text{-}2\text{-}II}$ were calculated from the mass balance through the polymerizations.
(4) Calculation of the Content of Propylene-Ethylene Random Copolymer Component (A-2-II) in Propylene-(Propylene-Ethylene) Block Copolymer and the Ethylene Content in Propylene-Ethylene Random Copolymer Component (A-2-II)
  The content of the propylene-ethylene random copolymer component (A-2-II) in a propylene-(propylene-ethylene) block copolymer and the ethylene content in the propylene-ethylene random copolymer component (A-2-II) were determined from a $^{13}$C-NMR spectrum measured under the conditions given below, according to the report made by Kakugo et al. (Macromolecules, 15, 1150-1152 (1982)).
  In a test tube having a diameter of 10 mm, about 200 mg of a propylene-(propylene-ethylene) block copolymer was dissolved uniformly in 3 ml of mixed solvent (o-dichlorobenzene/deuterated o-dichlorobenzene=4/1 in volume ratio) to give a sample solution, which was then measured for its $^{13}$C-NMR spectrum under the following conditions:
The measurement was performed using JNM-EX270 manufactured by JEOL Ltd.
measurement temperature: 135° C.,
pulse repeating time: 10 seconds,
pulse width: 45°, and
the number of integrations: 2500.

(5) Emitted Amount of VOC (Volatile Organic Compound)

The measurement of the emitted amount of VOC was carried out by the following method using a test piece described later.

(i) A test piece was sealed in a Tedler bag with a 10 L capacity and pure nitrogen gas was filled thereinto. Then, an operation of replacing the gas in the Tedler bag with nitrogen gas by exhausting the pure nitrogen gas was repeated twice.

(ii) The Tedler bag was filled up with 4 L of pure nitrogen gas, and a cock of the Tedler bag was closed. The Tedler bag was put in an oven. Then, a Teflon (registered trademark) tube for sampling was attached to the cock and extended to the outside of the oven. In this state, heat treatment was performed at 65° C. for two hours.

(iii) Collection and measurement of formaldehyde

The sample gas prepared in the foregoing (ii) was collected in an amount of 3 L into a 2,4-dinitrophenylhydrazine (abbreviated name: DNPH) cartridge at a condition heated at 65° C. The cartridge after the collection was subjected to elution treatment with acetonitrile, and the resulting eluate was treated with a high performance liquid chromatography (HPLC; Ultra Performance Liquid Chromatography Aquiy manufactured by Waters), followed by analysis of the components eluted from the cartridge.

(iv) Collection and measurement of toluene

The sample gas prepared in the foregoing (ii) was collected in an amount of 1 L into a TenaxTa adsorption tube at a condition heated at 65° C. The adsorption tube after the collection was analyzed with a GC-MS (gas chromatography-mass spectrometry analyzer). The components eluted from the tube were analyzed.

The components detected by the above-mentioned method are VOC. The emitted amount of VOC, which is the amount, represented in μg, of VOC emitted from one test piece with a predetermined size, was calculated using a calibration curve of a standard substance of each component. The case where no VOC was detected is expressed as "Not Detected".

(6) Light Stability

A test of stability against photodegradation was carried out using a xenon weather meter (model SX75AP) manufactured by Suga Test Instruments Co., Ltd. The presence of in appearance abnormality, such as cracks, in the surface of the test piece after 300 MJ irradiation was examined. The test conditions are given below. The less the cracks, the better the stability against photodegradation was judged to be.

Test piece size: A test piece (65×150×3 mm) cut from an injection molded article of 90 mm×150 mm×3 mm (thickness) in size, into the size of the holder of the testing machine.

Amount of light irradiation: 150 W/m$^2$ (in the region of 300 to 400 nm)

Black panel temperature: 83° C.

Humidity in testing machine bath: 50% RH

Observation of appearance abnormalities such as cracks: observation by a light microscope (100 magnifications)

(7) Heat Resistance

Heat Distortion Temperature (HDT)

The heat distortion temperature was measured at a fiber stress of 0.45 MPa in accordance with the method provided in JIS K-7207.

(Preparation of Injection Molded Article)

Test pieces (injection molded articles) for the above-mentioned volatile organic compound (VOC) measurement and other evaluations were prepared by the methods given below.

(i) Molding:

Injection molding was carried out at a molding temperature of 220° C. and a mold cooling temperature of 50° C. by using a Neomat 350/120 SYCAP-M Model injection molding machine manufactured by Sumitomo Heavy Industries, Ltd., giving a molded article having dimensions, MD length×TD length×thickness=150 mm×90 mm×3 mm.

(ii) Test Piece for VOC Measurement:

The above-mentioned injection molded article was cut so that the cut piece would become as wide as 80 cm$^2$ at each side, followed by being left at rest under a relative humidity 50% at a temperature of 23° C. for 14 days. The resulting piece was let be a test piece for measurement.

Example 1

(1) Production of Propylene-(Propylene-Ethylene) Block Copolymer (A-2)

Preparation of Solid Catalyst Component (1)

A 200-L SUS reactor equipped with a stirrer was filled with nitrogen, and then 80 L of hexane, 6.55 mol of titanium tetrabutoxide, 2.8 mol of diisobutyl phthalate, and 98.9 mol of tetraethoxysilane were charged therein, giving a homogeneous solution. Then, 51 L of a butylmagnesium chloride solution in diisobutyl ether with a concentration of 2.1 mol/L was dropped slowly over 5 hours while the temperature in the reactor was maintained at 5° C.

Following the completion of the dropping, the mixture was stirred at 5° C. for 1 hour and at room temperature for additional 1 hour, followed by solid-liquid separation at room temperature and subsequently by washing with 70-L toluene repeated three times. Then, the amount of toluene was adjusted so that the slurry concentration would become 0.2 kg/L, followed by stirring at 105° C. for 1 hour. After that, the mixture was cooled to 95° C. and 47.6 mol of diisobutyl phthalate was added thereto, followed by execution of a reaction at 95° C. for 30 minutes. After the reaction, the mixture was separated into a solid and a liquid, and the resulting solid was washed with 70 L toluene twice.

Then, the amount of toluene was adjusted so that the slurry concentration would become 0.4 kg/L, and thereafter 3.1 mol of diisobutyl phthalate, 8.9 mol of di-n-butyl ether and 274 mol of titanium tetrachloride were added, followed by execution of a reaction at 105° C. for 3 hours. After the completion of the reaction, solid-liquid separation was carried out at that temperature, and the resulting solid was washed at 105° C. with 90 L toluene twice. Then, the amount of toluene was adjusted so that the slurry concentration would become 0.4 kg/L, and thereafter 8.9 mol of di-n-butyl ether and 137 mol of titanium tetrachloride were added, followed by execution of a reaction at 105° C. for 1 hour. After the completion of reaction, solid-liquid separation was carried out at the same temperature, followed by washing with 90 L toluene at that temperature three times and with 70 L hexane at 105° C. three times and subsequently by drying under reduced pressure. As a result, 11.4 kg of a solid catalyst component was obtained. The solid catalyst component contained 1.83% by weight of titanium atom, 8.4% by weight of phthalate, 0.30% by weight of ethoxy group and 0.20% by weight of butoxy group. This solid catalyst component is hereafter called "solid catalyst component (I)."

(2) Production of Propylene-(Propylene-Ethylene) Block Copolymer (A-2):

Five SUS reactors having a capacity of 45 and 32 m³, each equipped with a stirrer and a jacket are purged fully with propylene, and then the pressure in the first reactor is adjusted at 0.5 kg/cm²G and 20 m³ of n-heptane is charged. After the start of the stirrer, 50 mol of triethylaluminums and 7.5 mol of cyclohexylethyldimethoxysilane are charged. Then, the inner temperature of the reactor is raised to 60 to 75° C. and subsequently the reaction pressure is increased to 4 to 8 kg/cm²G with propylene. Hydrogen was supplied so that the hydrogen concentration can be maintained at 6 to 8%, and then the solid catalyst component (I) was fed to start polymerization. At the same time, feed of triethylaluminum at 2.5 to 3.0 kg/H (about 24 to 25 mol/H) was started. After the start of the reaction, the stability in the reactor was confirmed and then the reaction pressure was increased to a target pressure, namely, 4.5 to 9.0 kg/cm²G. Then, the polymerization was continued while the feed was continued so that the hydrogen concentration in the gas phase could be kept at 8 to 10%. The formed polymerization slurry was discharged to the next reactor, and the polymerization was continued there under preset conditions. In the five consecutive reactors, polymerization to form a crystalline polypropylene portion (henceforth, abbreviated as "P portion") was continued. The P portion polymer was sampled, and was analyzed to have an intrinsic viscosities $[\eta]P$ of 0.93 dl/g.

Then, the reaction pressures in the 6th to 8th reactors were increased to 2 to 4 kg/cm²G with propylene and ethylene, and polymerization for producing an ethylene-propylene random copolymer portion (henceforth, abbreviated as "EP portion") was started. The polymerization for forming the EP portion was continued by continuously supplying a mixed gas of propylene/ethylene with maintenance of the reaction pressures at 2 to 4 kg/cm²G at a reaction temperature of 60° C. while adjusting the added amounts of the mixed gas of propylene/ethylene and hydrogen so that the hydrogen concentration in the gas phase could be kept at 0.1 to 0.2%. The formed polymer slurry was discharged to the next reactor, and the polymerization was continued there under preset conditions. In the three consecutive reactors, the polymerization for forming the EP portion was continued.

Then, the whole portion of the polymer slurry in the reactor was introduced into a deactivation vessel, followed by separation of remaining monomer and deactivation treatment with water. Subsequently, the polymer slurry was subjected to centrifugal separation, so that a solid polymer was collected. This was dried in a dryer, giving a white powder.

The finally obtained propylene-(propylene-ethylene) block copolymer in whole had an intrinsic viscosities $[\eta]T$ of 1.39 dl/g. An analysis revealed that the content of propylene-ethylene random copolymer (EP content) was 10% by weight. Therefore, the intrinsic viscosity $[\eta]_{EP}$ of the propylene-ethylene random copolymer portion (EP portion) produced in the third reactor was determined to be 5.5 dl/g. An analysis revealed that the EP portion had an ethylene content of 40% by weight and an mmmm fraction of 0.974. The MFR was 50 g/10 min.

[Pelletization (Melt-Kneading, Filtration)]

Fifty parts by weight of a powder of the obtained propylene-(propylene-ethylene) block copolymer (A-2), 10 parts by weight of a propylene homopolymer (A-1), 24 parts by weight of an inorganic filler (B-1), and 16 parts by weight of an ethylene-octene-1 random copolymer (D-1) were compounded. In addition, to 100 parts by weight in total of the components (A-1), (A-2), (B-1) and (D-1), 0.05 parts by weight of magnesium stearate, 0.05 part by weight of 3,9-bis[2-{3-(3-tert-butyl-4-hydroxy-5-methylphenyl)propionyloxy}-1,1-dimethylethyl]-2,4,8,10-tetraoxaspiro[5.5]undecane (SUMILIZER GA80, produced by Sumitomo Chemical Co., Ltd.), 0.05 parts by weight of bis(2,4-di-tert-butylphenyl)pentaerythritol diphosphite (ULTRANOX 0626, produced by GE Specialty Chemicals), 0.08 parts by weight of ethylene bisstearyl amide, 0.1 parts by weight of stearic acid monoglyceride (ELECTROSTRIPPER TS-5, produced by Kao Corporation.), and 0.1 parts by weight of a light stabilizer (C-1) were added and then premixed uniformly with a tumbler. Subsequently, the mixture was kneaded and extruded at an extrusion rate of 30 kg/hr, 200° C., and a screw rotation speed of 250 rpm by the use of a twin screw kneading extruder (triple thread twin screw kneading machine TEM50A manufactured by Toshiba Machine Co., Ltd.) to give a polypropylene resin composition.

[Production of Molded Article]

Test pieces (injection molded articles) were produced using an injection molding machine in accordance with the aforementioned methods. After conditioning them, a heat resistance test, a measurement of the emitted amount of VOC and a test of stability against photodegradation were carried out. The evaluation results are shown in Table 1.

Comparative Example 1

Operations were carried out in the same manner as that in Example 1 except for changing 0.1 parts by weight of the light stabilizer (C-1) to 0.05 parts by weight of (C-2) and 0.05 parts by weight of (C-3). The evaluation results are shown in Table 1.

Comparative Example 2

Operations were carried out in the same manner as that in Example 1 except for changing 0.1 parts by weight of the light stabilizer (C-1) to 0.1 parts by weight of (C-4). The evaluation results are shown in Table 1.

Comparative Example 3

Operations were carried out in the same manner as that in Example 1 except for changing 0.1 parts by weight of the light stabilizer (C-1) to 0.1 parts by weight of (C-5). The evaluation results are shown in Table 1.

Comparative Example 4

Production of Propylene-(Propylene-Ethylene) Block Copolymer (A-3)

[Prepolymerization]

Into a jacketed SUS reactor, degassed and dewatered n-hexane, a solid catalyst component (A) produced by the method disclosed in Example 5 of JP 7-216017 A, cyclohexylethyldimethoxysilane (B) and triethylaluminum (C) were fed so that the rates C/A=1.67 mmol/g and B/C=0.13 mmol/mmol would be achieved. Thereby, a prepolymerized catalyst component with a degree of prepolymerization of propylene of 3.5 was prepared. The degree of prepolymerization is defined by the number of grams of a prepolymer formed per gram of the solid catalyst component (A).

[Main Polymerization]

(I) First Polymerization Step (Production of Propylene Homopolymer Component (I))

(I-1) Liquid phase polymerization

After full replacement of the gas phase in a SUS loop liquid phase polymerization reactor by propylene, triethylaluminum (C) and cyclohexylethyldimethoxysilane (B) at a (B)/(C) ratio of 0.15 mol/mol and the aforementioned prepolymerized catalyst component at a rate of 2.2 g/hr were fed continuously. Then, the inner temperature was adjusted at 70° C. and the pressure was adjusted at 4.5 MPaG with propylene and hydrogen, and thereby polymerization of propylene was started. When the degree of polymerization reached 20% by weight of the overall degree of polymerization, a propylene homopolymer generated in the loop-type liquid phase polymerization reactor was discharged and was transferred to a gas phase polymerization reactor.

(I-2) Gas phase polymerization

The gas phase polymerization reactor was composed of three vessels and homopolymerization of propylene was carried out continuously in the first vessel and the second vessel. In a SUS reactor (the first vessel), under continuously feeding of propylene such that the reaction temperature and the reaction pressure would be kept at 80° C. and at 2.1 MPaG, respectively, and feeding of hydrogen such that the hydrogen concentration in the gas phase would be kept at 7.0 vol %, gas phase polymerization of propylene was carried out continuously in the presence of the powdery propylene homopolymer component formed in the loop-type liquid phase polymerization reactor.

Subsequently, part of the powdery propylene homopolymer component transported from the liquid phase polymerization reactor was transferred intermittently to a SUS reactor (the second vessel), and gas phase polymerization for producing a propylene homopolymer component (henceforth, abbreviated as polymer component (I)) was continued while propylene was supplied continuously under conditions such that a reaction temperature of 80° C. and a reaction pressure of 1.7 MPaG could be kept and hydrogen was supplied so that the hydrogen concentration in the gas phase could be kept at 7.0 vol %.

The polymer component (I) resulting from the polymerization in the second vessel was sampled and then analyzed to have an intrinsic viscosity $[\eta]_I$ of 1.07 dl/g and an mmmm fraction of 0.983.

(II) Second Polymerization Step (Production Propylene-Ethylene Random Copolymer Component (II))

Subsequently, part of the polymer component (I) produced in the second reactor was transferred to a jacketed SUS reactor (the third reactor), and polymerization for producing a propylene-ethylene random copolymer component (henceforth, abbreviated as copolymer component (II)) using propylene and ethylene was started. The gas phase polymerization for producing the copolymer component (II) was continued while propylene/ethylene was continuously supplied at a ratio of propylene/ethylene=2/1 (weight ratio) so that the reaction pressure could be kept at 1.3 MPaG at a reaction temperature of 70° C. and the hydrogen supply amount was adjusted so that the hydrogen concentration in the gas phase could be kept at 3.0 vol %.

Subsequently, a powder composed of the polymer component (I) and the copolymer component (II) in the reactor (the third reactor) was introduced intermittently into a deactivation vessel and was subjected to deactivation treatment of the catalyst component with water. Then, the powder was dried with 65° C. nitrogen to give a white powder of a propylene-(propylene-ethylene) block copolymer (propylene-based block copolymer (A-3)).

The propylene-(propylene-ethylene) block copolymer in whole had an intrinsic viscosity $[\eta]_{Total}$ of 1.4 dl/g and an ethylene content of 7.0% by weight. The polymerization ratio of the propylene homopolymer component (polymer component (I)) to the propylene-ethylene random copolymer component (copolymer component (II)) was determined to be 80/20 in weight ratio, which was calculated from the weight of the finally obtained propylene-(propylene-ethylene)block copolymer and the weight of the propylene homopolymer component (polymer component (I)). Therefore, the content of ethylene in the propylene-ethylene random copolymer component (copolymer component (II)) was 35% by weight, and the intrinsic viscosity $[\eta]_{II}$ of the propylene-ethylene random copolymer component (polymer component (II)) was 2.7 dl/g.

[Pelletization (Melt-Kneading, Filtration)]

A mixture was prepared by blending, to 100 parts by weight of the propylene-(propylene-ethylene) block copolymer powder (A-1) obtained above, 0.05 parts by weight of calcium stearate (produced by Kyodo Chemical Industry Co., Ltd.), 0.05 parts by weight of 3,9-bis[2-(3-(3-tert-butyl-4-hydroxy-5-methylphenyl)propionyloxy)-1,1-dimethyl-ethyl]-2,4,8,10-tetraoxaspiro[5.5]undecane (SUMILIZER GA80, produced by Sumitomo Chemical Co., Ltd.), 0.05 parts by weight of bis(2,4-di-tert-butylphenyl)pentaerythritol diphosphite (ADK STAB PEP-24G, produced by ADEKA Corp.), 0.3 parts by weight of stearic acid monoglyceride (ELECTROSTRIPPER TS-5, produced by Kao Corp.), 0.1 parts by weight of aluminum hydroxy-di(p-tert-butylbenzoate), 0.1 parts by weight of a light stabilizer (C-1), and an organic peroxide, 8% masterbatch of Perkadox 14 (i.e. a mixture of 8% by weight of an organic peroxide produced by Kayaku Akuzo Co., Ltd. and 92% by weight of a polypropylene powder (propylene homopolymer)) in an amount of 0.04 parts by weight (the amount of the organic peroxide=0.0032 parts by weight), by mixing them with a mixer. Subsequently, the resulting mixture, namely, the mixture of the propylene-(propylene-ethylene) block copolymer (A-3) powder and the above-mentioned additives, was melt-kneaded using a single screw extruder manufactured by Tanabe Plastics Machinery Co., Ltd. (inner diameter of barrel: 40 mm, screw rotation speed: 100 rpm, cylinder temperature: 230° C.). The melt-kneaded material was filtered through a stainless steel filter (FINEPORE NF15N manufactured by Nippon Seisen Co., Ltd.) attached to the die section of a twin screw extruder and then was extruded through the die section. The extrudate was cooled to solidify in cold water and then was cut to give pellets of a polypropylene resin composition. The extrusion capacity was 18 kg/hr.

Using the pellets, evaluations were carried out in the same manners as those in Example 1. The evaluation results are shown in Table 1.

Example 2

65.5 parts by weight of a powder of the propylene-(propylene-ethylene) block copolymer (A-2) obtained in Example 1, 21.5 parts by weight of an inorganic filler (B-2), and 13.5 parts by weight of an ethylene-octene-1 random copolymer (D-2) were compounded. In addition, to 100 parts by weight in total of the components (A-2), (B-2) and (D-2), 0.05 parts by weight of magnesium stearate, 0.2 part by weight of 2,4,8,10-tetra-tert-butyl-6-[3-(3-methyl-4-hydroxy-5-tert-butylphenyl)propoxy]dibenzo[d,f][1,3,2]dioxaphosphepin (SUMILIZER GP, produced by Sumitomo Chemical Co., Ltd.), 0.03 parts by weight of dimyristyl 3,3'-thiodipropionate (SUMILIZER TPM, produced by Sumitomo Chemical Co., Ltd.), 0.07 parts by weight of ethylene bisstearyl amide, 0.3 parts by weight of a mixture of stearic acid monoglyceride, stearic acid diglyceride and stearic acid diethanol amine (ANSTEX SP151, produced by TOHO Chemical Industry Co., Ltd.), and 0.15 parts by weight of a light stabilizer (C-1) were added and then premixed uniformly with a tumbler. Subsequently, the mixture was kneaded and extruded at an extrusion rate of 50 kg/hr, 200° C., and a screw rotation speed of 200 rpm by the use of a twin screw kneading extruder (TEX 44αII-49BW-3V, manufactured by The Japan Steel Works, Ltd.) to give a polypropylene resin composition.

[Production and Evaluation of Molded Article]

A test piece was produced using an injection molding machine. After conditioning, the emitted amount of VOC was measured. The evaluation result is shown in Table 2.

Example 3

Evaluation was carried out in the same manner as that in Example 2 except for changing 21.5 parts by weight of the inorganic filler (B-2) to 21.5 parts by weight of an inorganic filler (B-3). The evaluation result is shown in Table 2.

Example 4

Evaluation was carried out in the same manner as that in Example 2 except for changing 21.5 parts by weight of the inorganic filler (B-2) to 11 parts by weight of an inorganic filler (B-2) and 10 parts by weight of an inorganic filler (B-3). The evaluation result is shown in Table 2.

TABLE 1

|  |  |  | Example-1 | Comparative Example-1 | Comparative Example-2 | Comparative Example-3 | Comparative Example-4 |
|---|---|---|---|---|---|---|---|
| Component (A) | (A-1) | part by weight | 10 | 10 | 10 | 10 | 0 |
|  | (A-2) |  | 50 | 50 | 50 | 50 | 0 |
|  | (A-3) |  | 0 | 0 | 0 | 0 | 100 |
| Component (B) | (B-2) | part by weight | 24 | 24 | 24 | 24 | 0 |
| Component (C) | (C-1) | part by weight | 0.1 | 0 | 0 | 0 | 0.1 |
|  | (C-2) |  | 0 | 0.05 | 0 | 0 | 0 |
|  | (C-3) |  | 0 | 0.05 | 0 | 0 | 0 |
|  | (C-4) |  | 0 | 0 | 0.1 | 0 | 0 |
|  | (C-5) |  | 0 | 0 | 0 | 0.1 | 0 |
| Component (D) | (D-2) | part by weight | 16 | 16 | 16 | 16 | 0 |
| Heat resistance HDT |  | ° C. | 120 | 120 | 122 | 123 | 111 |
| VOC | Formaldehyde | μg/Test piece | Not detected | 0.06 | Not detected | 0.08 | Not detected |
|  | Toluene | μg/Test piece | 0.03 | 0.03 | 0.19 | 0.04 | 0.07 |
| Weather resistance (Presence of cracks) |  |  | No | Yes | Yes | Yes | No |

TABLE 2

|  |  |  | Example-2 | Example-3 | Example-4 |
|---|---|---|---|---|---|
| Component (A) | (A-2) | part by weight | 65.5 | 65.5 | 65.5 |
| Component (B) | (B-2) | part by weight | 21.5 | 0 | 11 |
|  | (B-3) |  | 0 | 21.5 | 0 |
|  | (B-4) |  | 0 | 0 | 10 |
| Component (C) | (C-1) | part by weight | 0.15 | 0.15 | 0.15 |
| Component (D) | (D-2) | part by weight | 13.5 | 13.5 | 13.5 |
| VOC | Formaldehyde | μg/Test piece | Not detected | Not detected | Not detected |
|  | Toluene | μg/Test piece | Not detected | Not detected | 0.02 |

INDUSTRIAL APPLICABILITY

According to the present invention, it is possible to obtain a polypropylene resin composition which can reduce the emitted amount of volatile organic compounds (VOC) and mold staining at the time of molding and provide molded articles excellent instability against light and thermal stability and to obtain a molded article produced therefrom.

The invention claimed is:

1. A polypropylene resin composition comprising 99 to 60 parts by weight of propylene-based polymer (A), 1 to 40 parts by weight of inorganic filler (B) having an average particle diameter of 0.01 to 100 μm, and 0.05 to 5 parts by weight of a hindered amine light stabilizer (C) which satisfies requirements (a), (b) and (c) defined provided below, provided that the combined amount of the propylene-based polymer (A) and the inorganic filler (B) is 100 parts by weight:

requirement (a): it has a 2,2,6,6-tetramethylpiperidyl group represented by formula (I);

requirement (b): it has an acid dissociation constant (pka) of less than 8;
requirement (c): the weight loss, as measured in a thermogravimetric analysis at a measurement temperature of 300° C. under a nitrogen gas atmosphere, is less than 10% by weight,
wherein the propylene-based polymer (A) has an MFR of 10 to 200 g/10 min as measured at a temperature of 230° C. and a load of 2.16 kgf in accordance with JIS K6758.

2. The polypropylene resin composition of claim 1, wherein the hindered amine light stabilizer (C) further satisfies the following requirement (d):
requirement (d): the molecular weight is 1000 or more.

3. The polypropylene resin composition of claim 1, wherein the hindered amine light stabilizer (C) is a copolymer having a maleic acid imide derivative component represented by formula (II):

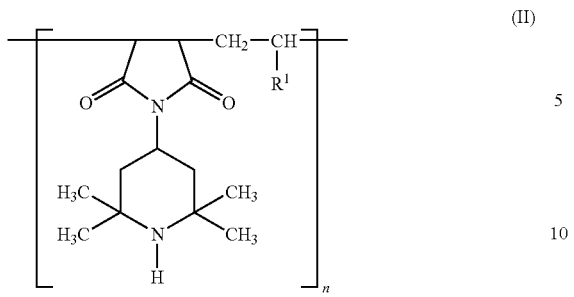 (II)

wherein R¹ represents an alkyl group having 10 to 30 carbon atoms and n represents an integer larger than 1.

4. The polypropylene resin composition of claim 1 further comprising 1 to 50 parts by weight of an ethylene-α-olefin copolymer (D) having a density of 0.85 to 0.91 g/cm³ and a melt flow rate, measured in accordance with JIS K7210 at 230° C. at a load of 2.16 kgf, of 0.05 to 100 g/10 min.

5. A molded article made of the polypropylene resin composition of claim 1.

* * * * *